(12) United States Patent
Mickens

(10) Patent No.: US 9,077,681 B2
(45) Date of Patent: Jul. 7, 2015

(54) PAGE LOADING OPTIMIZATION USING PAGE-MAINTAINED CACHE

(75) Inventor: James W. Mickens, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 229 days.

(21) Appl. No.: 12/898,128

(22) Filed: Oct. 5, 2010

(65) Prior Publication Data

US 2012/0084346 A1 Apr. 5, 2012

(51) Int. Cl.
- G06F 15/16 (2006.01)
- H04L 29/08 (2006.01)
- G06F 17/30 (2006.01)

(52) U.S. Cl.
CPC .......... H04L 67/02 (2013.01); G06F 17/30902 (2013.01); H04L 67/2842 (2013.01); H04L 67/289 (2013.01)

(58) Field of Classification Search
CPC .................. G06F 17/30861; G06F 17/30902; G06F 17/30905; H04L 67/2842; H04L 67/02; H04L 67/289
USPC ................................................. 709/203–318
See application file for complete search history.

(56) References Cited

U.S. PATENT DOCUMENTS

| | | | |
|---|---|---|---|
| 5,852,717 A | | 12/1998 | Bhide et al. |
| 6,185,617 B1 | | 2/2001 | Housel, III et al. |
| 6,907,429 B2 | | 6/2005 | Carneal et al. |
| 6,912,563 B1 | * | 6/2005 | Parker et al. ................. 709/204 |
| 7,039,699 B1 | * | 5/2006 | Narin et al. ................... 709/224 |
| 7,640,512 B1 | * | 12/2009 | Appling ........................ 715/771 |
| 7,856,583 B1 | * | 12/2010 | Smith ............................ 714/746 |
| 8,112,471 B2 | * | 2/2012 | Wei et al. ....................... 709/202 |
| 8,156,241 B1 | * | 4/2012 | Mukherjee et al. ........... 709/236 |
| 8,321,533 B2 | * | 11/2012 | Fainberg et al. .............. 709/219 |
| 2002/0133604 A1 | * | 9/2002 | Khanna et al. ................ 709/229 |
| 2004/0143668 A1 | * | 7/2004 | Falk et al. ..................... 709/228 |
| 2006/0200535 A1 | * | 9/2006 | Moser ............................ 709/217 |
| 2009/0024801 A1 | * | 1/2009 | Choi et al. .................... 711/144 |
| 2009/0100154 A1 | * | 4/2009 | Stevenson et al. ............ 709/220 |
| 2009/0204599 A1 | * | 8/2009 | Morris et al. ..................... 707/5 |

(Continued)

OTHER PUBLICATIONS

"AdWords Help: How does load time affect my landing page quality?", retrieved on Jul. 29, 2010 at <<http://adwords.google.com/support/aw/bin/answer.py?hl=en&answer=87144>>, Google, 2010. pp. 1-2.

(Continued)

Primary Examiner — Chau Le
Assistant Examiner — Don Zhao
(74) Attorney, Agent, or Firm — Judy Yee; Stephen A. Wight; Micky Minhas

(57) ABSTRACT

Web page loading time may be decreased with the use of a page-maintained storage cache on a client device. In various implementations, a server may receive a request for a web page from a web browser that is on the client device. The server may provide a chunk reassembler to the client device that determines whether any chunks in the web page are already stored on the client device. Subsequently, the server may send one or more chunk of the web page to the client device when the chunk reassembler determines that the one or more chunks of the web page are missing from the client device. The chunk reassembler may then instruct the web browser to assemble the one or more received chunks with the one or more chunks that are stored on the client device into the web page for presentation on the client device.

20 Claims, 7 Drawing Sheets

(56) References Cited

U.S. PATENT DOCUMENTS

| | | | | |
|---|---|---|---|---|
| 2010/0162126 | A1* | 6/2010 | Donaldson et al. | 715/738 |
| 2010/0312858 | A1* | 12/2010 | Mickens et al. | 709/219 |
| 2011/0029641 | A1* | 2/2011 | Fainberg et al. | 709/219 |
| 2011/0078152 | A1* | 3/2011 | Forman et al. | 707/747 |
| 2012/0066586 | A1* | 3/2012 | Shemesh | 715/235 |

OTHER PUBLICATIONS

"Akamai Reveals 2 Seconds as the New Threshold of Acceptability for eCommerce Web Page Response Times", retrieved on Jul. 30, 2010 at <<http://www.akamai.com/html/about/press/releases/2009/press_091409.html>>, Akamai Press Release, Sep. 14 2009, pp. 1-2.

"Best Practices for Speeding Up Your Web Site", retrieved on Jul. 30, 2010 at <<http://developer.yahoo.com/performance/rules.html>>, Yahoo! Developer Network, Yahoo! Inc., 2010, pp. 1-12.

Chakravorty, et al., "Performance Optimizations for Wireless Wide-area Networks: Comparative Study and Experimental Evaluation", retrieved on Jul. 30, 2010 at <<http://pages.cs.wisc.edu/~suman/pubs/wwan-opt-full.pdf>>, ACM, Proceedings of International Conference on Mobile Computing and Networking, Philadelphia, PA, 2004, pp. 159-173.

Chan, et al., "Cache-based Compaction: A New Technique for Optimizing Web Transfer", retrieved on Jul. 30, 2010 at <<http://citeseerx.ist.psu.edu/viewdoc/download?doi=10.1.1.32.9741&rep=rep1&type=pdf>>, IEEE, Proceedings of Joint Conference on Computer Communications (INFOCOM), New York, NY, vol. 1, Mar. 1999, pp. 117-125.

Deshpande, et al., "Caching Multidimensional Queries Using Chunks", retrieved on Jul. 30, 2010 at <<http://citeseerx.ist.psu.edu/viewdoc/download?doi=10.1.1.41.1062&rep=rep1&type=pdf>>, ACM, Proceedings of International Conference on Management of Data, Seattle, Washington, 1998, pp. 259-270.

Dixon, "Shopzilla's Site Redo—You Get What You Measure", retrieved on Jul. 30, 2010 at <<http://en.oreilly.com/velocity2009/public/schedule/detail/7709>>, O'Reilly Media, Inc., Velocity Conference Presentation, Jun. 2009, pp. 1-6.

Douglis, et al., "Application-specific Delta-encoding via Resemblance Detection", retrieved on Jul. 30, 2010 at <<http://www.research.ibm.com/people/i/iyengar/usenix03.pdf>>, USENIX Annual Technical Conference, Jun. 2003, pp. 113-126.

Fielding, et al., "Hypertext Transfer Protocol—HTTP/1.1", retrieved on Jul. 29, 2010 at <<http://www.w3.org/Protocols/rfc2616/rfc2616.html>>, The Internet Society, 1999, pp. 1-6.

Flanagan, "JavaScript: The Definitive Guide", O'Reilly Media, Inc., Fifth Edition, Aug. 2006, pp. 1-1020.

"Gears: Improving Your Web Browser", retrieved on Jul. 29, 2010 at <<http://gears.google.com/>>, Google, 2008, pp. 1.

"Gecko-Specific DOM Events", retrieved on Jul. 29, 2010 at <<https://developer.mozilla.org/en/Gecko-Specific_DOM_Events>>, Mozilla Developer Center, 2010, pp. 1.

Hickson, "Web Storage: W3C Working Draft Oct. 29, 2009", retrieved on Jul. 29, 2010 at <<http://www.w3.org/TR/2009/WD-webstorage-20091029/>>, W3C, 2009, pp. 1.

Kristol, et al., "HTTP State Management Mechanism", retrieved on Jul. 30, 2010 at <<http://www.ietf.org/rfc/rfc2109.txt>>, The Internet Society, Feb. 1997, pp. 1-19.

Le Hegaret, et al., "Document Object Model (DOM)", retrieved on Jul. 29, 2010 at <<http://www.w3.org/DOM/>>, W3C DOM IG, Jan. 19 2005, pp. 1-3.

Lin et al., "On the Performance of Persistent Connection in Modern Web Servers", retrieved on Aug. 20, 2010 at <<http://sites.google.com/site/linxz02/sac08.pdf, ACM, Mar. 2008, pp. 2403-2408.

Livshits, et al., "Doloto: Code Splitting for Network-Bound Web 2.0 Applications", retrieved on Jul. 30, 2010 at <<http://research.microsoft.com/en-us/um/people/livshits/papers/pdf/fse08.pdf>>, ACM, Proceedings of International Symposium on Foundations of Software Engineering (SIGSOFT), Atlanta, Georgia, Nov. 2008, pp. 350-360.

Mickens, et al., "Mugshot: Deterministic Capture and Replay for JavaScript Applications", retrieved on Jul. 29, 2010 at <<http://research.microsoft.com/apps/pubs/default.aspx?id=120937>>, Microsoft Corporation, Microsoft Research, Apr. 2010, pp. 1.

Milian, "What's powering Web apps: Google waving goodbye to Gears, hello to HTML5 (Updated)", retrieved on Jul. 29, 2010 at <<http://latimesblogs.latimes.com/technology/2009/11/google-gears.html>>, Los Angeles Times, 2010, pp. 1-8.

Mlinac, "YUI 2: ImageLoader", retrieved on Jul. 29, 2010 at <<http://developer.yahoo.com/yui/imageloader/>>, Yahoo! Inc., Yahoo! Developer Network, 2010, pp. 1-3.

Mogul, "Squeezing more bits out of HTTP caches", retrieved on Jul. 30, 2010 at <<http://apotheca.hpl.hp.com/ftp/pub/dec/WRL/mogul/ieeenetwork99.ps.>>, Draft, Oct. 6 1999, pp. 1-18.

Muthitacharoen, et al., "A Low-bandwidth Network File System", retrieved on Jul. 30, 2010 at <<http://pdos.csail.mit.edu/papers/lbfs-:sosp01/lbfs.pdf>>, ACM, Proceedings of Symposium on Operating Systems Principles, Banff, Canada, 2001, pp. 174-187.

Olshefski, et al., "Inferring Client Response Time at the Web Server", retrieved on Jul. 30, 2010 at <<http://www.ncl.cs.columbia.edu/publications/sigmetrics2002_certes.pdf>>, ACM, Proceedings of Joint International Conference on Measurement and Modeling of Computer Systems (SIGMETRICS), 2002, pp. 160-171.

Rabin, "Fingerprinting by Random Polynomials", retrieved on Jul. 30, 2010 at <<http://www.xmailserver.org/rabin.pdf>>, Harvard University, Technical Report TR-15-81, 1981, pp. 1-14.

Rajamony, et al., "Measuring Client-Perceived Response Times on the WWW", retrieved on Jul. 30, 2010 at <<http://www.usenix.org/event/usits01/full_papers/rajamony/rajamony.pdf>>, USENIX Association, Proceedings of Symposium on Internet Technologies and Systems, San Francisco, California, vol. 3, 2001, pp. 1-12.

Rhea, et al., "Value-Based Web Caching", retrieved on Jul. 30, 2010 at <<http://citeseerx.ist.psu.edu/viewdoc/download?doi=10.1.1.120.5127&rep=rep1&type=pdf>>, ACM, Proceedings of International World Wide Web Conference, Budapest, Hungary, May 2003, pp. 619-628.

Savant, et al., "Server-Friendly Delta Compression for Efficient Web Access", retrieved on Jul. 30, 2010 at <<http://citeseerx.ist.psu.edu/viewdoc/download?doi=10.1.1.7.8786&rep=rep1&type=pdf>>, Kluwer Academic Publishers, Proceedings of International Workshop on Web Content Caching and Distribution, 2004, pp. 303-322.

Shah, "How to make your website load fast?", retrieved on Jul. 30, 2010 at <<http://sks.com.np/article/5/how-to-make-your-website-load-faster.html>>, Sep. 23 2009, pp. 1-2.

Singhal, "Using site speed in web search ranking", retrieved on Jul. 29, 2010 at <<http://googlewebmastercentral.blogspot.com/2010/04/using-site-speed-in-web-search-ranking.html>>, Google Webmaster Central Blog, Apr. 9, 2010, pp. 1-43.

Souders, "High Performance Web Sites: Essential Knowledge for Frontend Engineers", O'Reilly, Sebastopol, CA, Sep. 2007, 170 pages.

Souders, "Loading Scripts Without Blocking", retrieved on Jul. 29, 2010 at <<http://www.stevesouders.com/blog/2009/04/27/loading-scripts-without-blocking/>>, High Performance Web Sites blog, Apr. 27 2009, pp. 1-7.

Theurer, "Performance Research, Part 2: Browser Cache Usage—Exposed!", retrieved on Jul. 29, 2010 at <<http://www.yuiblog.com/blog/2007/01/04/performance-research-part-2/>>, Yahoo! Inc., Yahoo! User Interface Blog (YUIBlog), Jan. 4 2007, pp. 1-18.

Welsh, et al., "SEDA: An Architecture for Well-Conditioned, Scalable Internet Services", retrieved on Jul. 30, 2010 at <<http://www.eecs.harvard.edu/~mdw/papers/seda-sosp01.pdf>>, ACM SIGOPS Operating Systems Review, Proceedings of Symposium on Operating Systems Principles (SOSP), Chateau Lake Louise, Canada, vol. 35, No. 5, Dec. 2001, pp. 230-243.

Mickens, "Silo: Exploiting JavaScript and DOM Storage for Faster Page Loads", in proceedings of WebApps'10, USENIX Conference on Web Application Development, Jun. 2010, 12 pages.

* cited by examiner

PAGE LOADING OPTIMIZATION USING PAGE-MAINTAINED CACHE

BACKGROUND

Users generally avoid slow loading websites and flock to fast loading websites. Websites with fast loading pages often have increased user satisfaction, and the increased user satisfaction typically results in longer visits and higher revenue for the website owners. Faster page loads may also lead to greater advertising income, as online advertisers prefer to display online advertisements on fast loading web pages rather than slow loading web pages. In some instances, search engines may also consider load time when ranking web pages. Thus, fast loading websites may receive a greater number of visits than slow loading websites.

A modern web page may contain many objects, and fetching these objects may require many network roundtrips. For example, a Transmission Control Protocol (TCP) handshake is generally used to establish each Hypertext Transfer Protocol (HTTP) connection, and at least one roundtrip is needed for each HTTP request/response pair. Thus, in the past, designers have tried to minimize the number of HTTP requests needed to fetch objects in a web page to decrease the load time of the web page. These minimization techniques generally have some drawbacks. For example, a direct way to make a web pages load faster is to make web pages that contain fewer web objects, thereby reducing the number of HTTP requests and roundtrips needed to load the web page. However, such a technique may result in less interesting and less visually appealing web pages, since the deleted objects may provide interactive functionality or customized visual styling.

Some web developers have also used a technique known as object inlining. In object inlining, multiple script files for generating a web page, such as JavaScript files, may be concatenated together to form a single script file for delivery to a client web browser. Likewise, multiple style sheets for the web page may also be combined into a single style sheet file for delivery. As a result, the number of HTTP requests and roundtrips used to load the web page may be reduced. The greatest saving may occur when all of a page's text-based objects (e.g., JavaScript, style sheets, and Hypertext Markup Language (HTML)) are directly aggregated, that is, inlined into the HTML of the enclosing web page. However, if any of the embedded objects described in the inlined HTML changes, the web browser must re-fetch all of the inlined objects in their entirety. Thus, object inlining may trade fewer HTTP requests during an initial loading of a web page for the possibility of subsequent greater bandwidth consumption during revisits to the same web page when even one of the inlined objects is modified.

SUMMARY

Described herein are techniques that enable an enhanced web server to reduce both the number of HTTP requests and the bandwidth used to provide a web page from the enhanced web server to a client-side web browser. The techniques may leverage the use of a client-side script and the document object model (DOM) storage of a web browser. The enhanced web server may break a HTML document that is inlined with text objects like script files and style sheet files into chunks. When a web browser on a client device requests the web page, the enhanced web server may determine the chunks of the HTML document that are already available in the DOM storage of the web browser; the server only sends the missing chunks to the client. Thus, the number of HTTP requests and the bandwidth used to provide a web page to the client device may be reduced, as the enhanced web server is able to selectively provide chunks that are not already available in the DOM storage, rather than provide all of the chunks for a second time. In other words, the techniques described herein allow browsers to cache inlined objects that were previously uncachable in prior inlining schemes.

In some embodiments, an enhanced server may receive a request for a web page from a web browser that is on the client device. The server may provide a chunk reassembler to the client device that determines which chunks of the web page are already stored on the client device. Subsequently, the server may send one or more chunks of the web page to the client device when the chunk reassembler determines that the one or more chunks of the web page are missing from the client device. The chunk reassembler may then instruct the web browser to combine any received chunks with the pre-existing chunks on the client device; the result is the original inlined web page suitable for presentation on the client device.

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference number in different figures indicates similar or identical items.

DETAILED DESCRIPTION

The web page loading optimization techniques described herein may enable an enhanced web server to reduce both the number of HTTP requests and the bandwidth needed to provide a web page from the enhanced web server to a client-side web browser. The techniques may leverage the use of a client-side script and the document object model (DOM) storage of a web browser. DOM storage enables a web page to maintain a key-value database on a client device. By default, a DOM storage-equipped web browser may allocate a predetermined number of megabytes (MB) (e.g., 5-10 MB) of DOM storage for storing data related to each domain. Some of the DOM storage-equipped web browsers may include web browsers that conform to the HTML5 specification, such as Internet Explorer 8 developed by the Microsoft Corporation of Redmond, Wash., Safari 4 developed by the Apple, Inc. of Cupertino, Calif., as well as Chrome 4 developed by Google, Inc. of Mountain View, Calif.

In various implementations, the enhanced web server may initially break a HTML document that is inlined with script files and style sheet files into chunks. Subsequently, when a client-side web browser requests a web page, the enhanced web server may return a script referred to herein as a chunk reassembler rather than HTML. The returned chunk reassembler may examine the DOM storage of the requesting web browser and inform the enhanced web server of locally available chunks in the DOM storage. Based on the response from the chunk reassembler, the enhanced web server may provide the client-side web browser with chunks that are not cached in the DOM storage and/or provide updated replacements for one or more cached chunks. As a result, in scenarios in which the requested web page includes content that was previously cached in the DOM storage, the number of HTTP requests and bandwidth consumption may be reduced when one or more cached chunks are reused.

By implementing the optimization techniques, web browsers may fetch HTML, style sheets, and script files for a web page from an enhanced web server using at most two HTTP roundtrips. Thus, the optimization techniques may restore the web browser cacheability that was previously destroyed by the use of object inlining. Further, since client-side chunk data may be associated with an entire domain, chunk data that is downloaded by a client-side web browser may be used to construct a sibling web page that is in the same domain; this sharing of chunk data may further speed up web page loading. Various example implementations of the loading optimization techniques are described below with reference to FIGS. 1-7.

Illustrative Environment

Figure 1:
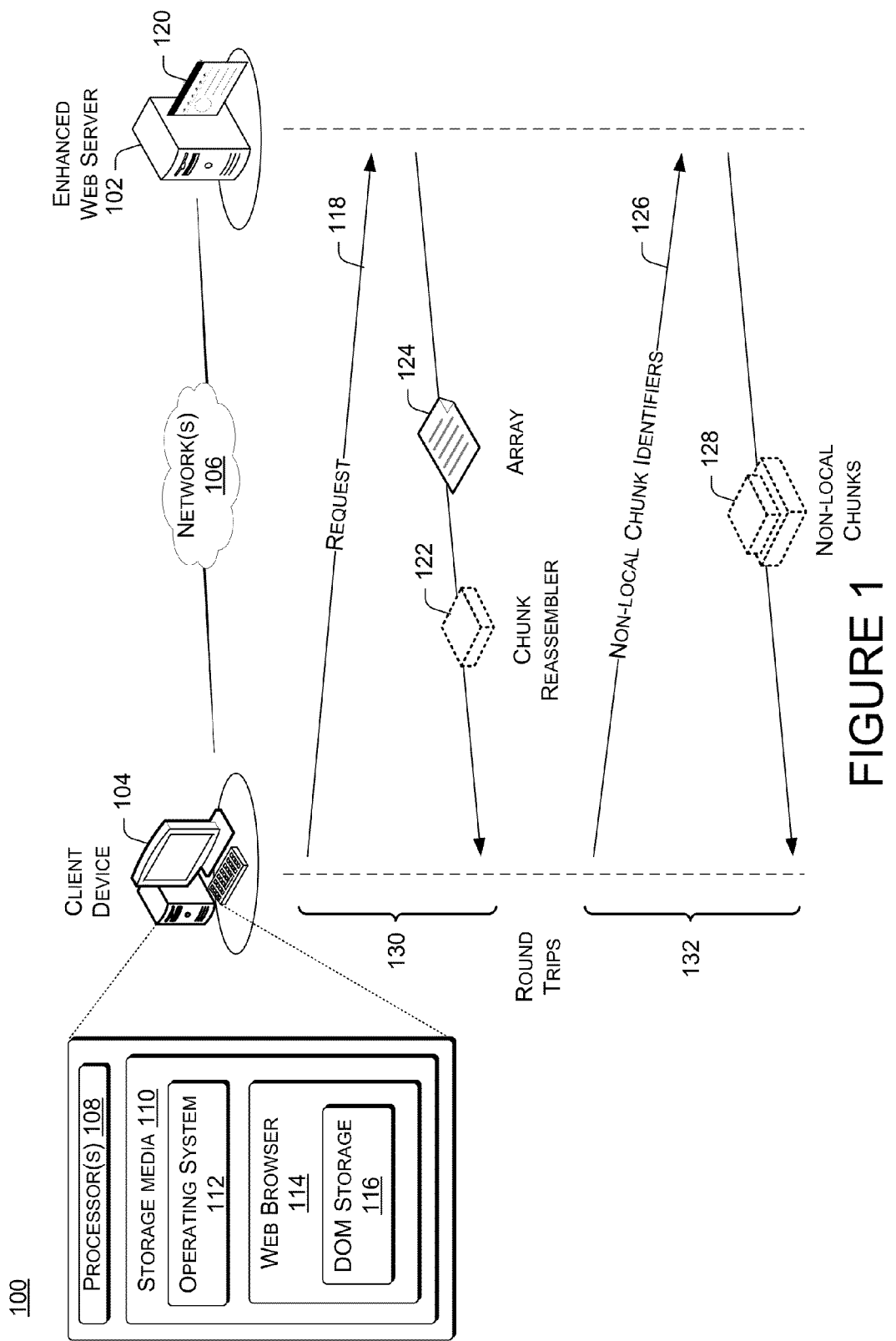
FIG. 1 is a schematic diagram of an illustrative environment for implementing the web page loading optimization.

FIG. 1 is a schematic diagram of an illustrative environment 100 for implementing the web page loading optimization. The web page loading optimization may be implemented using an enhanced web server 102. The enhanced web server 102 may be connected to a client device 104 by a network 106. The network 106 may be a local area network ("LAN"), a larger network such as a wide area network ("WAN"), and/or a collection of networks, such as the Internet. Protocols for network communication, such as TCP/IP, may be used to implement the one or more networks 106.

The enhanced web server 102 may deliver web pages to the client device 104. The client device 104 may be a desktop computer, a laptop computer, a server, a personal digital assistant (PDA), a smart phone, a set-top box, an Internet appliance, a game console, and/or other types of electronic devices. The client device 104 may includes one or more processors 108, memory 110, and/or user controls that enable a user to interact with the device. The user controls of the client device 104 may include, but are not limited to, combinations of one or more of keypads, keyboards, mouse devices, touch screens, microphones, speech recognition packages, and any other suitable devices or other electronic/software selection methods.

The memory 110 of the client device 104 may store an operating system 112. The operating system 112 may include components that enable the client device 104 to receive data via various inputs (e.g., user controls, network interfaces, and/or memory devices), and process the data using the one or more processors 108 to generate output. The operating system 112 may include one or more components that present the output (e.g., display an image on an electronic display, store data in memory, transmit data to another electronic device, etc.). Additionally, the operating system 112 may include other components that perform various other functions generally associated with an operating system. The memory 110 may also store a web browser 114 that is equipped with DOM storage 116, such as a web browser that conforms to HTML5 specification.

During operation, a DOM storage-equipped web browser 114 on the client device 104 may issue a web page request message 118 for a web page 120 that is on the enhanced web server 102. However, instead of responding with the HTML for the web page 120, the enhanced web server 102 may send a chunk reassembler 122 and an array 124 of identifiers which specify the chunks of data that make up the web page 120. In some embodiments, the chunk reassembler 122 may be written in JavaScript. JavaScript may be used in implementing the chunk reassembler for three reasons: (1) JavaScript applications can dynamically modify the content of a web page; (2) JavaScript can associate large amounts of persistent local data with each web domain; and (3) JavaScript can use Asynchronous JavaScript and XML (AJAX) calls to construct new communication protocols on top of HTTP. However, it will be appreciated that the chunk reassembler 122 may be constructed using other scripting languages in additional embodiments.

Upon reaching the web browser 114, the chunk reassembler 122 may inspect the DOM storage 116 of the web browser 114 to determine which of the chunks listed in the chunk identifier array 124 are missing from the DOM storage 116. The chunk reassembler 122 may then report the missing chunks to the enhanced web server 102. In various embodiments, the chunk reassembler 122 written in JavaScript may use a message 126, such as a synchronous AJAX POST message, to send the missing chunk identifiers to the enhanced web server 102. For example, if the web browser 114 is requesting the web page 120 for a first time, then all of the chunks for constructing the web page 120 may be missing. However, if the web browser 114 is requesting a previously downloaded web page 120, then only some of the chucks may be missing.

In response to the message 126, the enhanced web server 102 may reply with missing chunks 128. The missing chunks 128 may be chunks that were never downloaded by the web browser 114, or newer versions of chunks previously downloaded by the web browser 114. The enhanced web server 102 may supply the missing chunks as a continuous string of HTML data. For example, assume that there are three missing chunks 128, as represented by "abc", "def", and "ghi", respectively. The enhanced web server 102 may send the three missing chunks 128 as the HTML string <html>"abc/def/ghi/"<html>, in which each delimiter "/" indicates a boundary between chunks. In turn, the chunk reassembler 122 on the client device 104 may perform a substring extraction operation based on the delimiters to extract the three missing chunks 128 (e.g., "abc", "def", and "ghi") from the HTML string.

Subsequently, the chunk reassembler 122 may direct the web browser 114 to assemble the relevant chunks (e.g., locally stored chunks and/or extracted chunks) to construct an inlined web page. In some embodiments, the chunk reassembler 122 may direct the web browser 114 to overwrite the previous HTML of the web page 120 that is being displayed by the web browser 114 during the assembly of the relevant chunks. The chunk reassembler 122 may achieve such overwrites by making DOM calls to the web browser 114 that enables web pages to overwrite their own content.

For example, when the chunk reassembler 122 in the form of JavaScript calls document.open( ) the web browser 114 may clear any preexisting presentation-layer data associated with a web page, i.e., the JavaScript state may be preserved, but the existing HTML in the web page 120 may be discarded. The chunk reassembler 122 may write new HTML to the web page using one or more calls to document.write(html_str). Further, when the chunk reassembler 122 has written the entire new HTML, the chunk reassembler 122 may call document.close( ) which may instruct the web browser to finish parsing the HTML stream and update the presentation layer. Thus, by leveraging these DOM calls, the chunk reassembler 122 may dynamically construct the web page 120 from locally cached data chunks and new chunks sent by the enhanced web server 102.

In this way, the web browser 114 may use two HTTP roundtrips, such as roundtrips 130 and 132, to fetch any arbitrary number of HTML, style sheets, and script files for the construction of the web page 120, without undergoing any modification.

Example Enhanced Web Server

Figure 2:
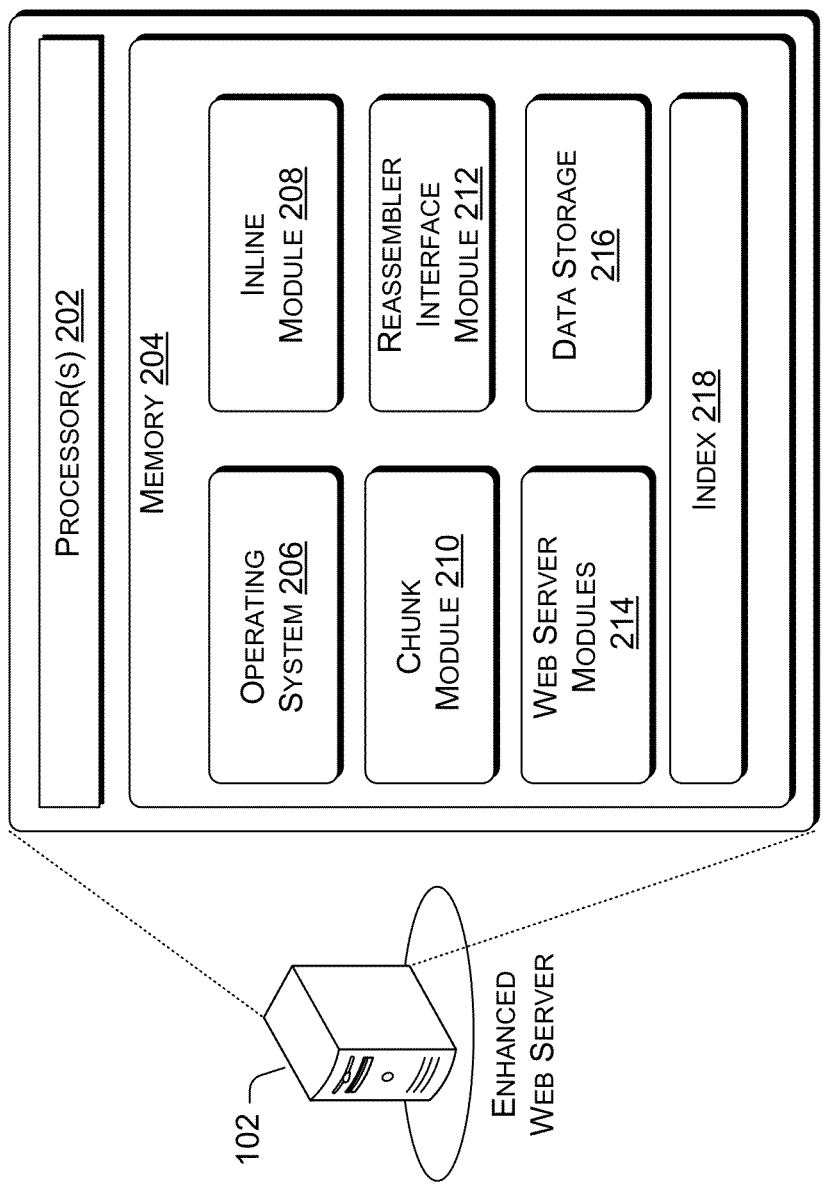
FIG. 2 is a block diagram of an enhanced web server that implements web page loading optimization.

FIG. 2 is a block diagram of an enhanced web server 102 that implements web page loading optimization. The enhanced web server 102 may include one or more processors 202, memory 204, and/or user controls that enable a user to interact with the device. The user controls of the enhanced web server 102 may include, but are not limited to, combinations of one or more of keypads, keyboards, mouse devices, touch screens, microphones, speech recognition packages, and any other suitable devices or other electronic/software selection methods.

The memory 204 may store an operating system 206. The operating system 206 may include components that enable the enhanced web server 102 to receive data via various inputs (e.g., user controls, network interfaces, and/or memory devices), and process the data using the one or more processors 202 to generate output. The operating system 206 may include one or more components that present the output (e.g., display an image on an electronic display, store data in memory, transmit data to another electronic device, etc.). Additionally, the operating system 206 may include other components that perform various other functions generally associated with an operating system.

The memory 204 may also store components that facilitate the optimized downloading of a web page from the enhanced web server 102 by a client-side web browser, such as the web browser 114. The components, or modules, may include routines, programs instructions, objects, scripts, and/or data structures that perform particular tasks or implement particular abstract data types. The components may include an inline module 208, a chunk module 210, a reassembler interface module 212, web server modules 214, and data storage 216.

The inline module 208 may perform object inlining on a web page, such as the web page 120. The object inlining may be performed on the web page 120 when a web developer stores the completed web page 120 in the enhanced web server 102. In various embodiments, the inline module 208 may perform the object inlining by inserting all of the objects (e.g., scripts and style sheets) directly into the HTML coding of the web page 120.

The chunk module 210 may divide a web page 120 that includes inlined data, into content-delimited chunks. In various embodiments, the boundaries of the content-delimited chunks may be induced by special byte sequences in the data of the web page 120. For example, the chunk module 210 may push a sliding window across the data of a source document of the web page 120 and declare a chunk boundary when a Rabin hash value of the window has a predetermined number, N, of zeroes in the lower-order bits. Thus, by varying N, the chunk module 210 may control the expected chunk size. With the use of content-delimited chunks, any modification to the content of the web page 120 may create or delete several chunks, but the modification will not cause chunk invalidation after an edited chunk due to the change in the size of an edited chunk.

The chunk module 210 may also assign a unique identifier to each chunk of the web page 120. In some embodiments, the chunk module 210 may use a hash (e.g., SHA1 hash) of the data in each chunk to create unique identifiers for the chunks. However, in other embodiments, the chunk module 210 may assign other distinctive identifiers, such as globally unique identifiers (GUIDs), time stamps, or strictly increasing identifiers to the chunks. Further, when an original chunk of the web page 120 with a unique identifier is modified, the chunk module 210 may assign a different identifier to the resultant modified chunk. In this way, different versions of the same web page may be quickly and efficiently constructed with the use of the identifiers. The chunk module 210 may further maintain an index of the chunk identifiers, such as the index 218, for each web page.

The chunk module 210 may perform different levels of chunking granularity depending on developer selected settings. In some embodiments, the chunk module 210 may be configured to chunk by size specification, so that the web page 120 is chunked into chunks of a predetermined size (e.g., 2 KB chunks). In other embodiments, the chunk module 210 may perform data structure specific chunking. For example, if a web developer knows that the HTML for a web page developed in a structured way, the web developer may configure the chunk module 210 to convert the web page into HTML-specific chunks. Alternatively, the chunk module 210 may be configured to chunk at a file level based on the original object files associated with the web page, e.g., with each style sheet and JavaScript file residing in its own single chunk. The chunk module 210 may divide the web page 120 content-delimited chunk prior to or upon receiving a request for the web page 120 from the web browser 114 on the client device 104.

The reassembler interface module 212 may distribute the chunk reassembler 122 and the chunk identifier array 124 to a web browser 114 that resides on the client device 104 in response to a web page request. Additionally, when the chunk reassembler 122 returns data regarding chunks listed in the chunk identifier array 124 that are not stored locally in the DOM storage 116 of the web browser 114, the reassembler interface module 212 may retrieve the missing chunks from the data storage 216 and transmit the missing chunks 128 to the chunk reassembler 122.

In some embodiments, the reassembler interface module 212 may be further optimized to handle a "cold" DOM storage differently. A "cold" DOM storage may be a DOM storage 116 that does not contain any chunks for the assembly of a particular web page. The optimization of the reassembler interface module 212 is described below with respect to FIG. 3.

Figure 3:
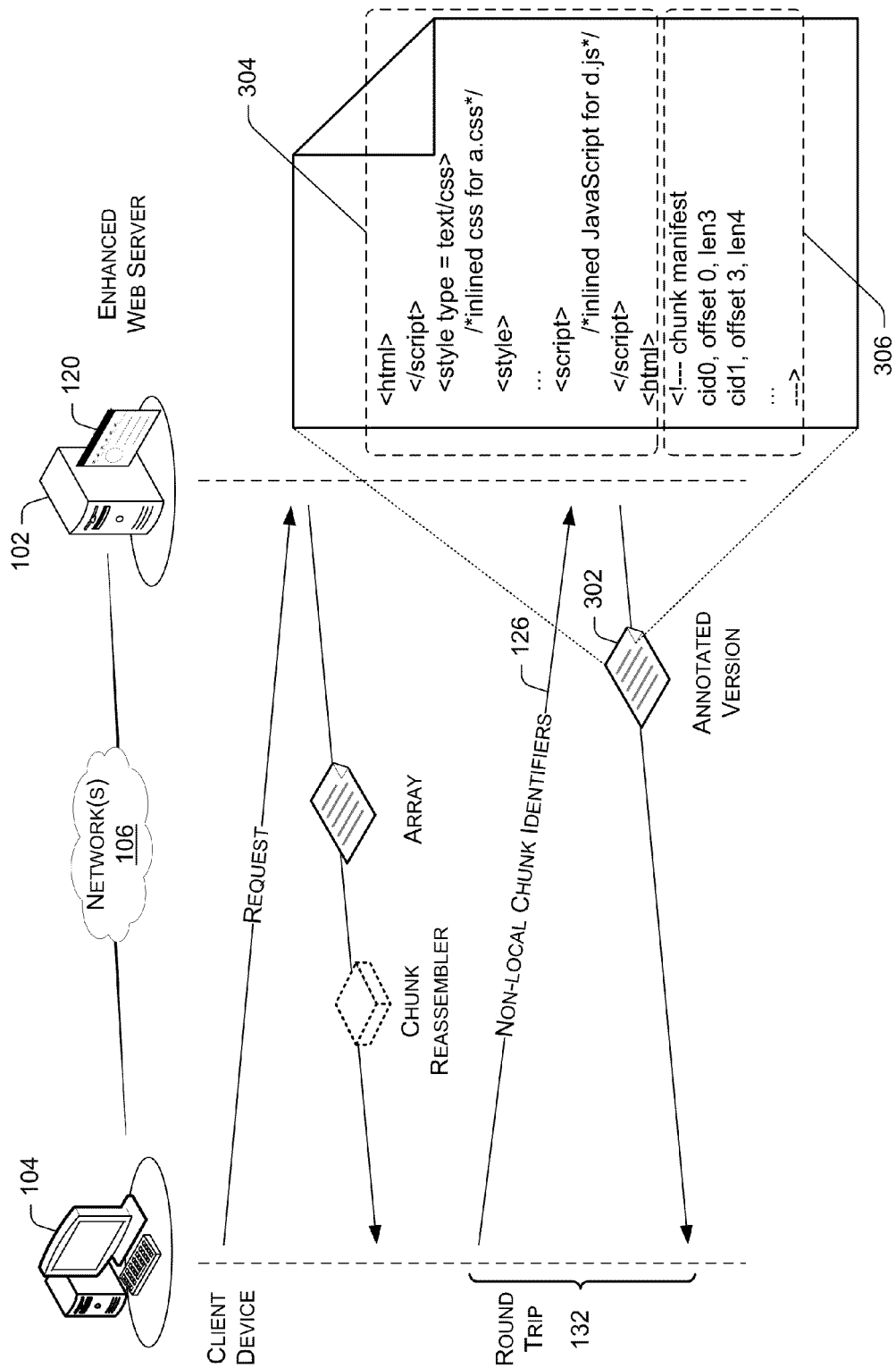
FIG. 3 is a schematic diagram that depicts an optimization of the reassembler interface module of the enhanced web server to interact with a "cold" DOM storage of a web browser.

FIG. 3 is a schematic diagram that depicts an optimization of the reassembler interface module of the enhanced web server to interact with a "cold" DOM storage of a web browser. As described above, upon receiving a HTML string of chunks from the enhanced web server 102, a chunk reassembler 122 on a client device 104 may initially perform substring extraction operations on the HTML string of chunks. The chunk reassembler 122 may then direct the web browser 114 to construct the web page 120 using at least the extracted chunks. However, the extraction of chunks by parsing of the HTML string using substring extraction operations may cause a delay in the loading of the web page. For example, the substring extraction operations may consume hundreds of milliseconds if an inlined web page contains hundreds of kilobytes (KB) of data and/or hundred of chunks. As a result, in a scenario in which the DOM storage 116 of the web browser 114 is "cold", the web page load may be noticeably delayed by the substring extraction operations. However, as described below, such delay may be easily avoided.

As shown in FIG. 3, during the second roundtrip 132, the reassembler interface module 212 of the enhanced web server 102 may receive a message 126 that indicates the DOM storage 116 of the web browser 114 is "cold", that is, the DOM storage 116 does not include any of the chunks for constructing the web page 120. To improve the load time of the web page 120, the reassembler interface module 212 may assemble and send an annotated version 302 of the web page 120 in response to such a message 126.

The annotated version 302 may include inlined HTML, such as example inlined HTML 304, that includes inlined style sheets and inlined scripts. The annotated version 302 may also include a chunk manifest, such as an example chunk manifest 306. In some embodiments, the chunk manifest 306 may reside within a HTML comment in the inlined version 302, so that the chunk manifest 306 is not visible to the web browser 114's display engine. Thus, since no substring extractions are necessary to display the inlined HTML 304, the chunk reassembler 122 on the client device 104 may direct the web browser 114 to immediately present the inlined version 302 as a web page.

At a later time, the chunk reassembler 122 may asynchronously parse the inlined HTML 304 into chunks for storage in the DOM storage 116 based on the chunk manifest 306. The chunk manifest 304 may describe the chunks that are in the inlined HTML 304 using corresponding offset and length notations. For example, as shown, the chunk manifest 306 may include a first offset of "0" and a length notation of "3" for a chunk having the identifier "cid0" in the inlined HTML 304. The chunk manifest 306 may also include a first offset of "3" and a length notation of "4" for a chunk having the identifier "cid1", and so forth.

In this way, upon receiving the annotated version 302, the chunk reassembler 122 may immediately commit the inlined HTML 304 of the annotated version 302 for presentation as a web page. Then, during subsequent idle time, the chunk reassembler 122 may use the chunk manifest 306 to locally divide the inlined HTML into identified chunks (e.g., chuck "cid0", chunk "cid1") at the client device 104 for storage in the DOM storage 116.

Returning to FIG. 2, the web server modules 214 may be modules that perform operations that are generally associated with a web server which are not handled by the other modules. Accordingly, the server modules 214 may facilitate the delivery of web content, such as images, audio and/or video clips, style sheets, and scripts, to requesting clients.

The data storage 216 may store the web pages, such as the web page 120, and/or the inlined counterparts of the web pages. The inlined web pages may include data objects such as style sheets and JavaScripts. The data storage 216 may also store other data object that are used for constructing web pages, such as image object, audio objects, and/or video objects. Additionally, the data storage 216 may store the chunk reassembler 122, the chunks of the web pages, as well as indexes of identifiers (e.g., index 218) for the chunks.

The operating system 206, as described above, may enable a user to interact with the modules of the enhanced web server 102 via user controls. In various embodiments, the inline module 208 may provide a user interface via the operating system 206 that enable the users to select data objects to be inlined into the HTML coding of the web pages. The chunk module 210 may also provide a user interface that enables the user to specify the parameters for chunking the inlined web pages.

Figure 4:
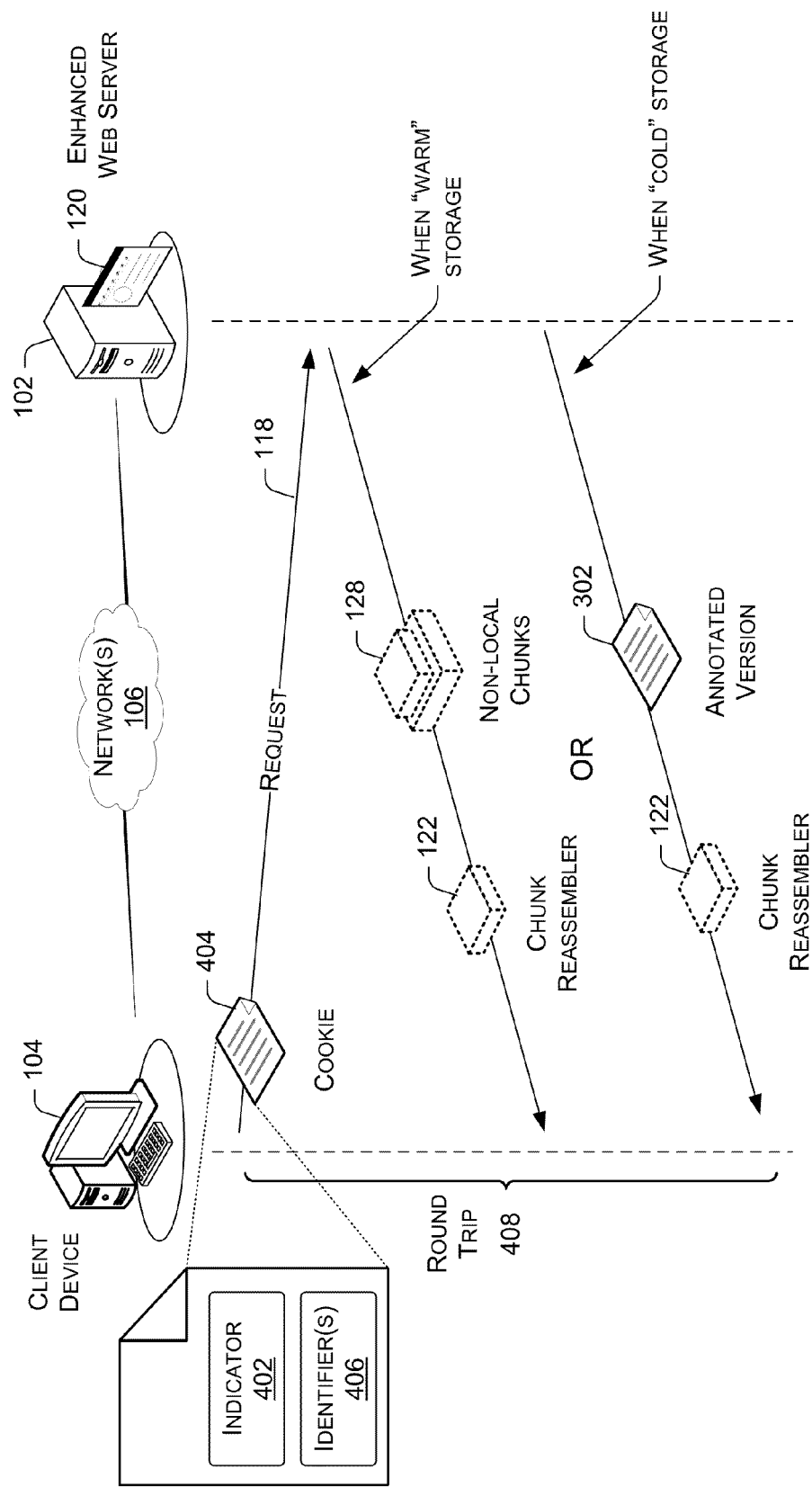
FIG. 4 is a schematic diagram that depicts the use of cookies to facilitate the optimization of web page loading.

FIG. 4 is a schematic diagram that depicts the use of cookies to facilitate the optimization of web page loading. As described above, the use of an annotated version of a web page, such as the annotated version 302, may eliminate initial client-side substring extraction operations for a "cold" DOM storage. However, even with such an optimization, the client device 104 may nevertheless use two HTTP roundtrips to construct a web page (e.g., web page 120). In a further optimization described below for an instance of a "cold" DOM storage, the chunk reassembler 122 and the reassembler interface module 212 may be further modified to use cookies to eliminate one of the two HTTP roundtrips.

In various embodiments, the chunk reassembler 122 may set a "warm cache" indicator 402 in a cookie 404 of a web page, such as the web page 120, whenever the chunk reassembler 122 stores one or more chunks into the DOM storage 116 for the web page 120. The storage of the chunks into the DOM storage 116 may occur as part of the second HTTP roundtrip 132, or as a part of the local chunk extraction based on the chunk manifest that occurs on the client device 104. Additionally, the chunk reassembler 122 may also write the one or more identifiers 406 of the stored chunks to the cookie 404.

Subsequently, when the web browser 114 requests the same web page 120, the web browser 114 may send the data in the corresponding cookie 404 along with the web page request message 118 to the enhanced web server 102. Based on the "warm cache" indicator 402 and the identifiers of the previously stored chunks, the reassembler interface module 212 may ascertain whether the chunks of the web page 120 already reside on the client device 104.

Assuming that one or more chunks are missing from the client device 104, the reassembler interface module 212 may return the missing chunks 128, as well as the chunk reassembler 122, to the client device 104. The chunk reassembler 122 may then assemble the web page 120 from the relevant chunks (i.e., locally stored and newly return chunks). Otherwise, if no chunks are missing, the reassembler interface module 212 may simply return the chunk reassembler 122 to construct the web page 120 using the chunks that are stored in the DOM storage 116. In this way, the enhanced web server 102 may provide a web page 120 to the web browser 114 in a single HTTP roundtrip 408, thereby eliminating the second HTTP roundtrip associated as described in FIG. 1.

However, if no cookie 404 with a "warm cache" indicator 402 and/or identifiers 406 of previously stored data chunks is sent with the initial web page request message 118, then the reassembler interface module 212 may determine the DOM storage 116 is "cold". For example, the DOM storage 116 may be "cold" either because the client device 104 has never visited the web page 120 before, or the client device 104 has visited the web page 120 before, but the DOM storage 116 is empty for some other reason. For example, previous data chunk writes to the DOM storage 116 may have failed due to lack of free space. Subsequently, the reassembler interface module 212 may respond with the annotated version 302 of the web page 120, as well as the chunk reassembler 122. In such a scenario, the chunk reassembler 122 may direct the web browser 114 to present the web page 120, and also parse the annotated version 302 into data chunks for storage in the DOM storage 116.

Using such optimizations, the enhanced web server 102 may provide the web page 120 to the web browser 114 in a single HTTP roundtrip 408, regardless of whether the DOM storage is "cold" or "warm", thereby eliminating the second HTTP roundtrip as described in FIG. 1.

In some embodiments in which the cookies, such as the cookie 404, are used to optimize web page loading speed, the chunk module 210 may assign strings, rather than use hashes, as the identifiers for the data chunks. For example, web browsers typically restrict cookie sizes to 4 KB, and SHA1 hashes are 20 bytes, so a cookie may hold a maximum of 204 SHA1 chunk ids. Thus, if chunks are 2 KB on average, then a cookie may reference a maximum of 408 KB of locally cached chunk data. For many web pages, 408 KB may be sufficient to encode several versions of a web page. However, some web pages may be of so large in size that even a single snapshot of each web page's HTML, style sheets, and scripts may not fit into 408 KB of chunk-addressable storage. Thus, the chunk module 210 or the reassembler interface module 212 may be configured to assign data chunks with identifiers having byte sizes that are smaller than the size of SHA1 hashes.

For example, the chunk module 210 may assign each new and unique chunk a strictly increasing 3-byte identifier. Since client-side DOM storage is partitioned by domain, it is only necessary for these identifiers to be collision-free within a domain, not the entire Internet. Accordingly, with 3-byte identifiers, a domain may define over 16 million unique chunks before having to "reset" a namespace, and a 4 KB cookie may store 1365 of these 3-byte identifiers. With 2 KB chunks, the use of 3-byte identifiers may enable the chunk module 210 to name roughly 2.7 MB of locally cache data chunks, which may be sufficient to encode multiple versions of a single web page.

Example Processes

Figure 5:
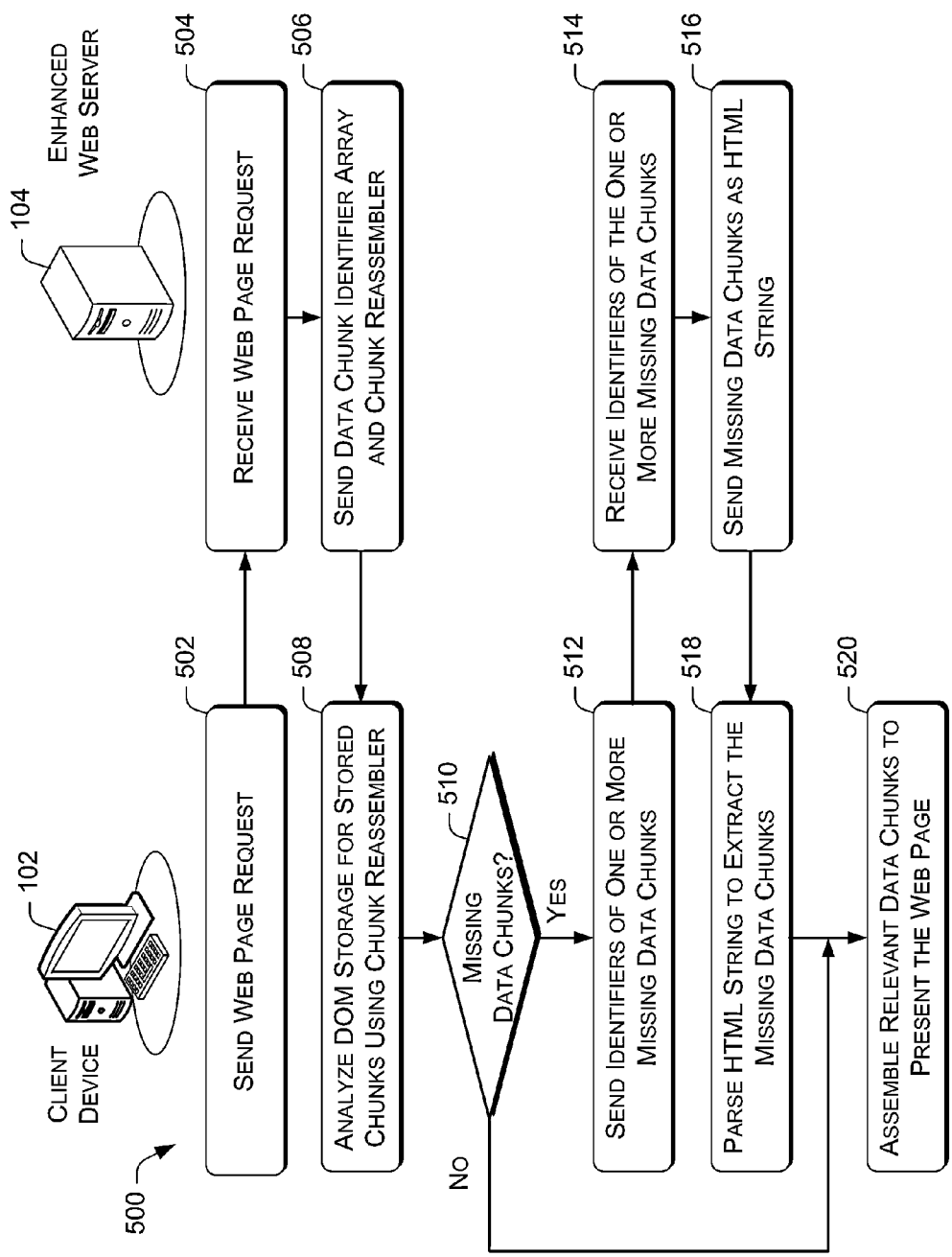
FIG. 5 is a flow diagram of an illustrative process to implement HTTP roundtrip optimization of web page loading.
Figure 6:
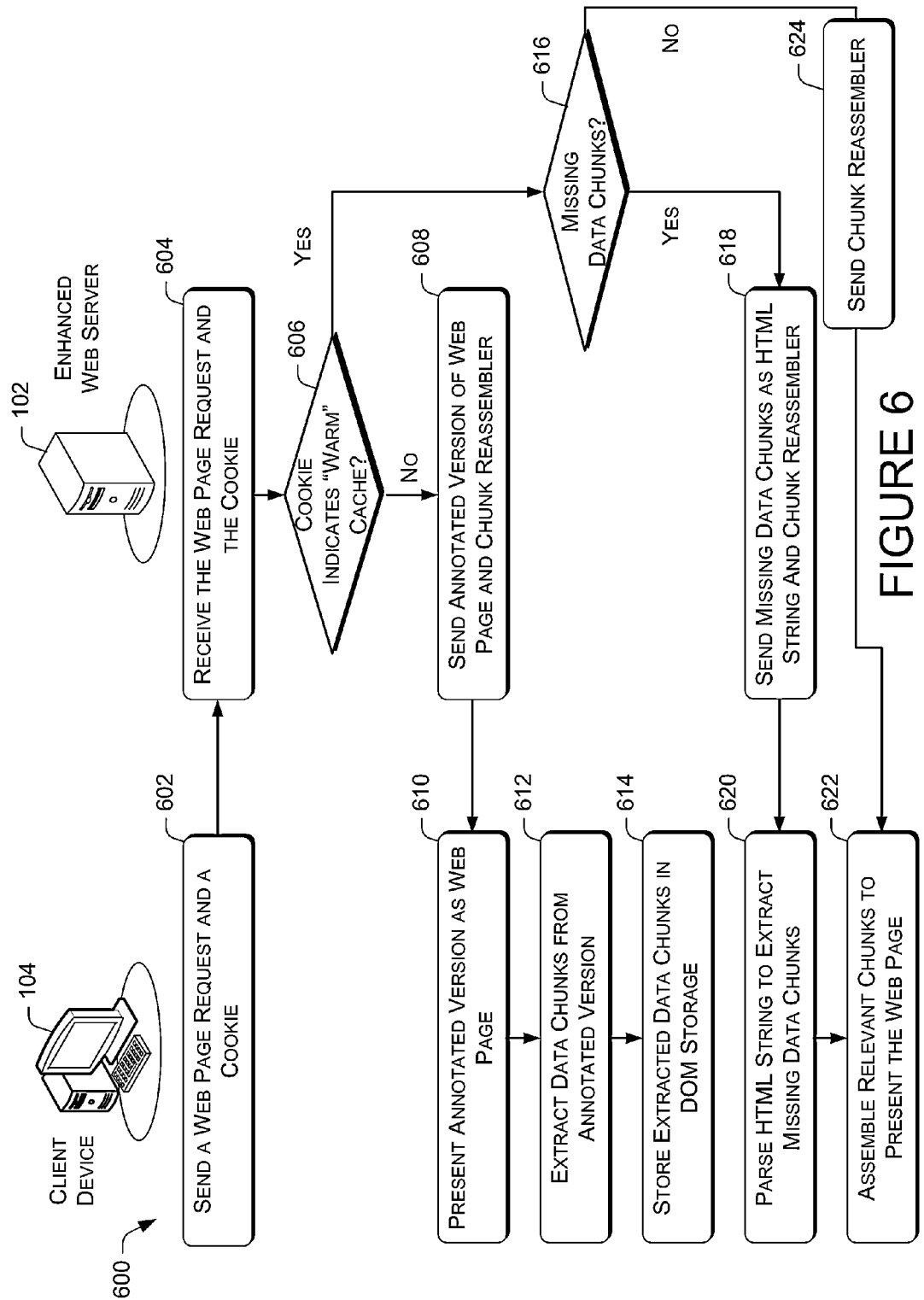
FIG. 6 is a block diagram of an illustrative process to implement HTTP roundtrip optimization of web page loading based on a cache status of a web browser.

FIGS. 5 and 6 describe various example processes for implementing the web page loading optimization techniques. The example processes are described in the context of the environment 100 of FIG. 1, but is not limited to that environment. The order in which the operations are described in each example process is not intended to be construed as a limitation, and any number of the described blocks can be combined in any order and/or in parallel to implement each process. Moreover, the blocks in each of the FIGS. 5 and 6 may be operations that can be implemented in hardware, software, and a combination thereof. In the context of software, the blocks represent computer-executable instructions that, when executed by one or more processors, cause one or more processors to perform the recited operations. Generally, the computer-executable instructions may include routines, programs, objects, components, data structures, and the like that cause the particular functions to be performed or particular abstract data types to be implemented.

FIG. 5 is a flow diagram of an illustrative process 500 to implement a two HTTP roundtrip optimization of web page loading. At block 502, the web browser 114 on the client device 104 may send a web page request message 118 for the webpage 120 to the enhanced web server 102. At block 504, the reassembler interface module 212 on the enhanced web server 102 may receive the web page request message 118. At block 506, the reassembler interface module 212 may send a chunk reassembler 122 and a chunk identifier array 124 to the client device 104.

At block 508, once the chunk reassembler 122 arrives at the client device 104, the chunk reassembler 122 may analyze the DOM storage 116 of the web browser 114 to determine the chunks in the web page 120 that are already stored in the DOM storage 116 according to the chunk identifier array 124.

At decision block 510, the chunk reassembler 122 may determine whether one or more data chunks for constructing the web page 120 are missing. If one or more data chunks are missing ("yes" at decision block 510), the process 500 may proceed to block 512.

At block 512, the chunk reassembler 122 may send the identifiers of the missing data chunks the enhanced web server 102. At block 514, the reassembler interface module 212 may receive the identifiers of the one or more missing data chunks.

At block 516, the reassembler interface module 212 may consult an index 218 of the data chunks for constructing the web page 120 that is stored in the data storage 216. Subsequently, the reassembler interface module 212 may send the one or more missing data chunks to the web browser 114 as a HTML string.

At block 518, the chunk reassembler 122 may perform substring extraction operations to extract one or more missing data chunks. At block 520, the chunk reassembler 122 may direct the web browser 114 to assemble the relevant data chunks (e.g., one or more received missing data chunks and/or one or more locally stored data chunks in the DOM storage 116) into the web page 120 by making DOM calls to the web browser 114.

Returning to decision block 510, if the chunk reassembler 122 determines that all of the data chunks for constructing the web page 120 already exist in the DOM storage 116 ("no" at decision block 510), the process 500 may proceed to directly to block 520 so that the chunk reassembler 122 may direct the web browser 114 to assemble the relevant data chunks into the web page 120.

FIG. 6 is a block diagram of an illustrative process 600 to implement HTTP roundtrip optimization of web page loading based on the cache status of a web browser.

At block 602, the web browser 114 on the client device 104 may send a web page request 118 for the web page 120 and cookie 404 to the enhanced web server 102. At block 604, the reassembler interface module 212 on the enhanced web server 102 may receive the web page request 118. At decision block 606, the reassembler interface module 606 may analyze the data in the cookie to determine whether a "warm" cache indicator is present. Thus, if the "warm" cache indicator is not present ("no" at decision block 606), the process 600 may proceed to block 608.

At block 608, the reassembler interface module 212 may send the annotated version 302 of the web page 120 and the chunk reassembler 122 to the client device 104. The annotated version 302 may include inlined HTML, such as the inlined HTML 304. The inline HTML may include style sheets and scripts, as well as a chunk manifest 306. At block 610, the chunk reassembler 122 may direct the web browser 114 to present the annotated version of the web page 120 by making DOM calls.

At block 612, the chunk reassembler 122 may extract data chunks from the annotated version 302 of the web page 120 based on the chunk manifest 306. At block 614, the chunk reassembler 122 may store the extracted data chunks in the DOM storage 116 of the web browser 114.

Returning to decision block 606, if the reassembler interface module 212 determines that a "warm" cache indicator is present in the cookie 404 ("yes" at decision block 606), the process 600 may proceed to decision block 616.

At decision block 616, the reassembler interface module 212 may determine if the DOM storage 116 of the web browser 114 is missing any data chunks for constructing the web page 120. In various embodiments, the reassembler interface module 212 may perform this analysis as the cookie 404 may also include one or more identifiers 406 of data chunks that are locally stored in the DOM storage 116. Thus, the reassembler interface module 212 may compare such data to the index 218 of chunk identifiers in the data storage 216.

Thus, if the reassembler interface module 212 determines that one or more data chunks for constructing the web page 120 are missing from the DOM storage 116 ("yes" at decision block 616), the process 600 may proceed to block 618. At block 618, the reassembler interface module 212 may send the chunk reassembler 122 and the one or more missing data chunks to the client device 104 as a HTML string.

At block 620, the chunk reassembler 122 may perform substring extraction operations to extract the one or more missing data chunks. At block 622, the chunk reassembler 122 may direct the web browser 114 to assemble the relevant data chunks (e.g., one or more received missing data chunks and/or one or more locally stored data chunks in the DOM storage 116) into the web page 120 by making DOM calls to the web browser 114.

Returning to decision block 616, if the reassembler interface module 212 determines that the DOM storage 116 includes all the data chunks for constructing the web page 120 ("no" at decision block 616), the process 600 may proceed to block 624. At block 624, the reassembler interface module 212 may send the chunk reassembler 122 to the client device 104. Subsequently, the process 600 may loop back to block 622, so that the chunk reassembler 122 may direct the web browser 114 to assemble the data chunks stored in the DOM storage 116 into the web page 120.

Example Electronic Device

Figure 7:
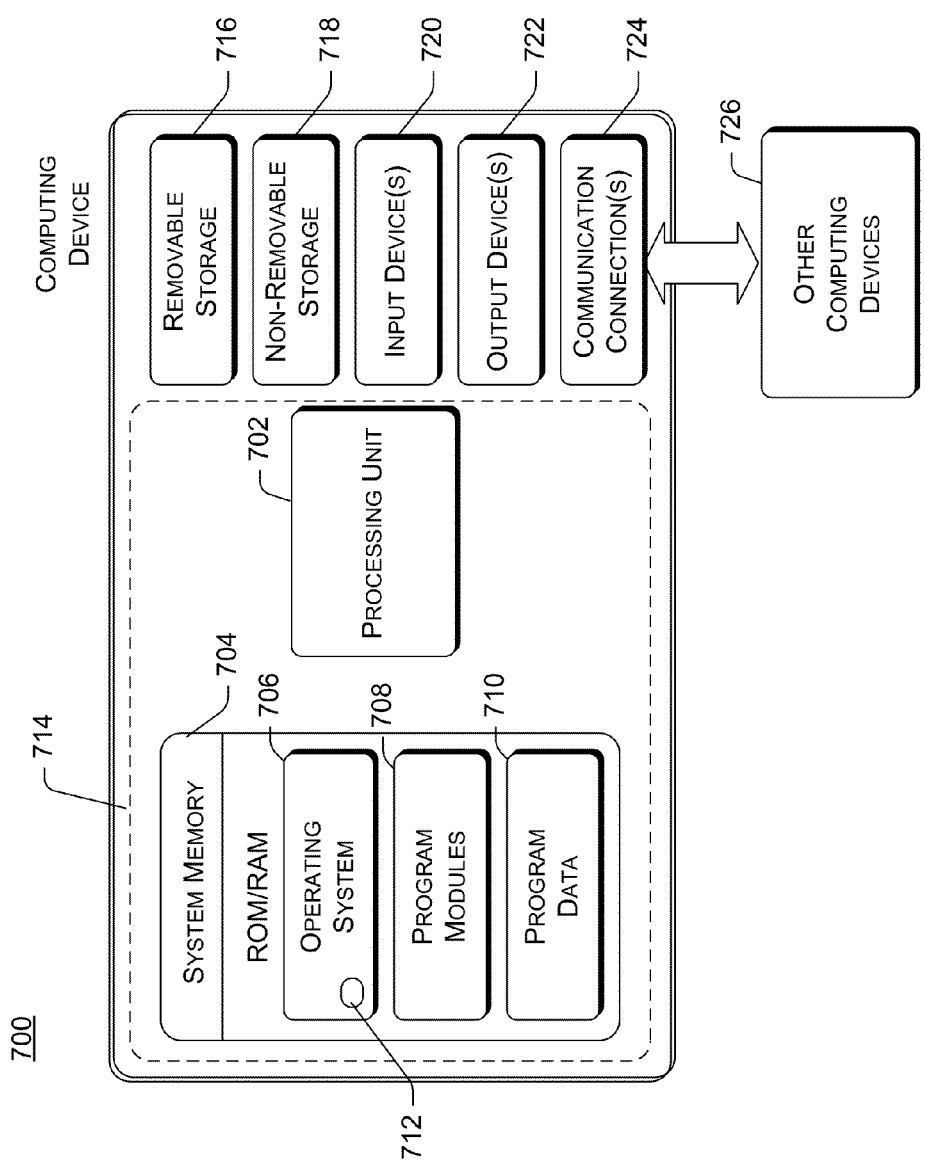
FIG. 7 is a block diagram of an illustrative electronic device that implements various aspects of web page loading optimization.

FIG. 7 illustrates a representative electronic device 700, such as the client device 104 and/or the enhanced web server 102, which may be used to implement the web page loading optimization techniques. However, it is understood that the techniques and mechanisms described herein may be implemented in other electronic devices, systems, and environments. The electronic device 700 shown in FIG. 7 is only one example of an electronic device and is not intended to suggest any limitation as to the scope of use or functionality of the computer and network architectures. The electronic device 700 does not have any dependency or requirement relating to any one or combination of components illustrated in the example electronic device.

In at least one configuration, electronic device 700 typically includes at least one processing unit 702 and system memory 704. Depending on the exact configuration and type of electronic device, system memory 704 may be volatile (such as RAM), non-volatile (such as ROM, flash memory, etc.) or some combination thereof. System memory 704 may include an operating system 706, one or more program modules 708, and may include program data 710. The electronic device 700 is of a very basic configuration demarcated by a dashed line 714. Again, a terminal may have fewer components but may interact with an electronic device that may have such a basic configuration.

Electronic device 700 may have additional features or functionality. For example, electronic device 700 may also include additional data storage devices (removable and/or non-removable) such as, for example, magnetic disks, optical disks, or tape. Such additional storage is illustrated in FIG. 7 by removable storage 716 and non-removable storage 718. Computer storage media may include volatile and nonvolatile, removable and non-removable media implemented in any method or technology for storage of information, such as computer-readable instructions, data structures, program modules, or other data. System memory 704, removable storage 716 and non-removable storage 718 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by Electronic device 700. Any such computer storage media may be part of the electronic device 700. Electronic device 700 may also have input device(s) 720 such as keyboard, mouse, pen, voice input device, touch input device, etc. Output device(s) 722 such as a display, speakers, printer, etc. may also be included.

Electronic device 700 may also contain communication connections 724 that allow the device to communicate with other electronic devices 726, such as over a network. These networks may include wired networks as well as wireless networks. Communication connections 724 are some examples of communication media. Communication media may typically be embodied by computer-readable instructions, data structures, program modules, etc.

It is appreciated that the illustrated electronic device 700 is only one example of a suitable device and is not intended to suggest any limitation as to the scope of use or functionality of the various embodiments described. Other well-known electronic devices, systems, environments and/or configurations that may be suitable for use with the embodiments include, but are not limited to personal computers, server computers, hand-held or laptop devices, multiprocessor systems, microprocessor-base systems, set top boxes, game consoles, programmable consumer electronics, network PCs, minicomputers, mainframe computers, distributed computing environments that include any of the above systems or devices, and/or the like.

By implementing the optimization techniques, web browsers may fetch HTML, style sheets, and script files for a web page from an enhanced web server using at most two HTTP roundtrips. Thus, the optimization techniques may restore web browser cacheability that was previously destroyed by the use of object inlining without modification to the web browsers.

CONCLUSION

In closing, although the various embodiments have been described in language specific to structural features and/or methodological acts, it is to be understood that the subject matter defined in the appended representations is not necessarily limited to the specific features or acts described. Rather, the specific features and acts are disclosed as exemplary forms of implementing the claimed subject matter.

The invention claimed is:

1. A computer-readable memory storing computer-executable instructions that, when executed, cause one or more processors to perform operations comprising:
   receiving a request for a web page from a web browser of a client device and a cookie;
   in response to receiving the cookie and the cookie including an indicator indicating every portion of a plurality of portions of the web page are stored on the client device, sending a reassembler instructing the web browser to assemble at least some portions of the plurality of portions that are stored on the client device into the web page for presentation on the client device;
   in response to receiving the cookie and the cookie including the indicator indicating one or more portions of the plurality of portions of the web page are stored on the client device and determining that at least one portion of the plurality of portions of the web page is missing from the client device, sending the at least one portion and the reassembler to the client device, the reassembler instructing the web browser to combine the at least one portion with the one or more of the portions that are stored on the client device into the web page for presentation on the client device; and in response to receiving the cookie and the cookie not including the indicator, sending an annotated version of the web page and the reassembler to the client device for presentation on the client device.

2. The computer-readable memory of claim 1, the operations further comprising inlining one or more objects into HTML coding of the web page and dividing the web page into the plurality of portions prior to or upon receiving the request for the web page, the one or more objects including at least one of a script, a style sheet, or another text-based object.

3. The computer-readable memory of claim 2, the operations further comprising:

assigning a unique identifier to each portion of the plurality of portions of the web page; in response to receiving the cookie and the cookie including the indicator indicating that the one or more portions are stored on the client device and identifiers of the one or more portions that are stored on the client device, comparing the identifiers of the one or more portions that are stored on the client device with the unique identifier to each portion of the plurality of portions of the web page; and identifying the at least one portion of the plurality of portions of the web page that is missing from the client device.

4. The computer-readable memory of claim 3, wherein the assigning includes assigning a hash of data in a particular portion of the plurality of portions as an unique identifier to the particular portion, a globally unique identifier (GUID) to the particular portion, or a strictly increasing identifier to the particular portion.

5. The computer-readable memory of claim 2, wherein the dividing of the web page into the plurality of portions includes dividing the web page into content-delimited portions using Rabin hash values.

6. The computer-readable memory of claim 2, wherein the dividing of the web page into the plurality of portions includes dividing the web page into the plurality of portions based on a predetermined size limitation for individual portions of the plurality of portions or a data structure of the web page, or dividing the web page to encapsulate the script or the style sheet in a portion of the plurality of portions.

7. The computer-readable memory of claim 1, wherein the reassembler is a JavaScript application.

8. The computer-readable memory of claim 1, wherein the sending the at least one portion and the reassembler includes sending the at least one portion to the client device as a delimited HTML string for substring extraction into the at least one portion by the reassembler.

9. The computer-readable memory of claim 1, wherein the annotated version of the web page comprises inlined HTML that includes one or more inlined objects and a manifest that is used by the reassembler to parse the inlined HTML into the plurality of portions subsequent to a display of the annotated version of the web page on the client device.

10. The computer-readable memory of claim 1, the operations further comprising, prior to receiving, at the server, the request for the web page, determining whether the one or more portions are stored in a document object model (DOM) storage of the web browser on the client device.

11. The computer-readable memory of claim 1, wherein a portion of the plurality of portions of the web page comprises a chunk of the web page.

12. A method, comprising:

receiving, at a server, a request for a web page and a cookie from a web browser that is on a client device;

in response to the cookie indicating to the server that no chunks of the web page are stored on the client device, sending an annotated version of the web page and a chunk reassembler from the server to the client device, the chunk reassembler to parse inlined Hypertext Markup Language (HTML) of the annotated version into chunks according to a chunk manifest in the annotated version;

in response to an indicator stored on the cookie indicating to the server that all of the chunks of the web page are stored on the client device, sending at least the chunk reassembler from the server to the client device, the chunk reassembler to instruct the web browser to assemble the chunks of the web page for presentation on the client device; and in response to the indicator stored on the cookie indicating that at least one chunk of the chunks of the web page that are stored on the client device is missing from the client device, sending the at least one chunk and the chunk reassembler to the client device, the chunk reassembler instructing the web browser to assemble the at least one chunk with one or more of the chunks of the web page that are stored on the client device into the web page for presentation on the client device.

13. The method of claim 12, wherein the inlined HTML comprises one or more inlined objects, and the one or more inlined objects includes at least one of a script, style sheet, or another text-based object.

14. The method of claim 12, wherein the chunk reassembler is to further instruct the web browser to display the inlined HTML in the annotated version of the web page prior to the parse of the inlined HTML of the annotated version of the web page into the chunks.

15. The method of claim 12, wherein the chunk reassembler is to further store the chunks into a document object model (DOM) storage of the web browser.

16. The method of claim 12, wherein the cookie further includes a list of individual chunks of the chunks of the web page that are stored on the client device.

17. A server, comprising:

one or more processors; and a memory that includes components that are executable by the one or more processors to perform actions comprising:

inlining one or more objects into Hypertext Markup Language (HTML) of a web page, the one or more objects including at least one of a script or a style sheet;

dividing the web page into a plurality of portions and assigning an unique identifier to each portion of the plurality of portions;

receiving a cookie from a web browser;

in response to an indicator associated with the cookie indicating that every portion of the plurality of portions of the web page is stored on a client device, sending at least a reassembler instructing the web browser to assemble at least some of the plurality of portions that are stored on the client device into the web page for presentation on the client device;

in response to the indicator associated with the cookie indicating that one or more portions of the plurality of portions of the web page are stored on the client device and that at least one portion of the plurality of portions of the web page is missing from the client device, sending the at least one portion and a reassembler from the server to a client device, the reassembler following arrival at the client device instructing the web browser on the client device to assemble the at least one portion with the one or more portions that are stored on the client device into the web page for presentation on the client device; and in response to the cookie not including the indicator and indicating that none of the portions of the plurality of portions of the web page are stored on the client device, sending an annotated version of the web page and the reassembler to the client device for presentation on the client device.

18. The server of claim 17, wherein the cookie from the web browser includes identifiers of the one or more portions that are stored on the client device.

19. The server of claim 18, wherein the actions further comprise determining the one or more portions that are stored on the client device by comparing the one or more identifiers in the cookie to an index of identifiers for the plurality of portions of the web page.

20. The server of claim 17, wherein in response to the cookie not including the indicator, the reassembler instructing the web browser to display inlined HTML of the annotated version at the client device, and parsing the inlined HTML into the plurality of portions according to a manifest in the annotated version at the client device.

\* \* \* \* \*